A. S. TIFFANY & A. L. WILSON.
Apparatus for the Manufacture of Vinegar.
No. 54,041. Patented April 17, 1866.
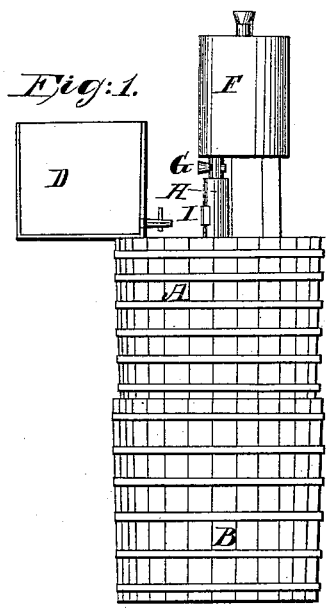
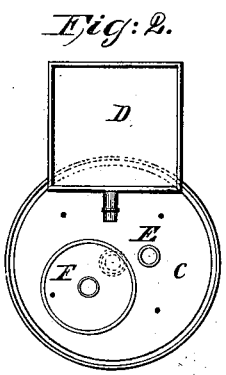
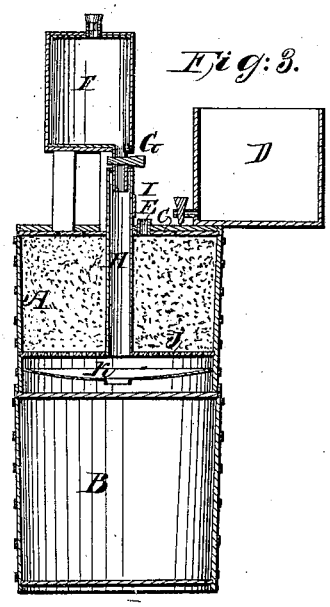
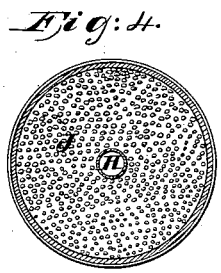
Witnesses:
Inventor:

UNITED STATES PATENT OFFICE.

ASA SCOTT TIFFANY, OF SCOTT COUNTY, IOWA, AND ALBERT LUCIEN WILSON, OF ROCK ISLAND COUNTY, ILLINOIS.

IMPROVEMENT IN APPARATUS FOR THE MANUFACTURE OF VINEGAR.

Specification forming part of Letters Patent No. 54,041, dated April 17, 1866.

*To all whom it may concern:*

Be it known that we, ASA SCOTT TIFFANY, of the county of Scott and State of Iowa, and ALBERT LUCIEN WILSON, of the county of Rock Island and State of Illinois, have invented a new and useful Improvement in the Manufacture of Vinegar and Rectifying of Spirits, preventing loss by evaporation in such manufacture or rectifying; and we do hereby declare that the following is a full, clear, and exact description of the construction of the same, reference being had to the annexed drawings.

Figure 1 is a view of elevation. Fig. 2 is a plan of top. Fig. 3 is a sectional view. Fig. 4 is a false perforated head.

Letters of reference indicate corresponding parts in the four figures.

A A is a condenser-cylinder, of wood, the sides of which are made air-tight, having a bottom head slightly concave on the upper side, with a hole in the center, also a perforated false head three inches above the bottom one, on and above which the cylinder A A is filled with charcoal or other filtering substances or materials and fitted air-tight or sealed onto the top of the generator or rectifier B B, which is coated with an impervious compound or material on the outer surface that will make it air-tight, as well as prevent the escape of vapors through the pores of the timber, composed of rosin, beeswax, olean, and stearine, varied in proportion to suit the temperature, the condenser being coated with the same.

C is the upper head of the condenser, containing holes, through which cold water passes into and among the filling inside the condenser, for the purpose of condensing the spirits contained in the vapors always rising inside and otherwise escaping from the generator or rectifier, precipitating the alcohol or spirits back again and preventing their escape.

D is a tank containing cold water, which is fed through and onto the head of the condenser, passing through, as described, afterward passing through the perforated false head in the lower end of condenser, and uniting on the lower concave head next under or below with the alcoholic feed, and thence passing directly into the generator, forming its part in the vinegar or whisky.

E is a short tubular hole in the upper head of the condenser, through which the ascending air, after the alcoholic substance or spirits have been taken from it, is permitted to escape.

F is a vessel containing alcohol, high-wines, or other spirits used in making vinegar or rectifying, having a tubular hole in top for the convenience of filling the same.

The spirits are fed into the wood tube H, by means of faucet G, in quantity, rapidity, or quality to suit requirements, the connection of faucet G with tube H being cork-lined and air-tight. The tube H receives and conveys the alcoholic feed down through the upper head-filling and perforated false head J of the condenser, and empties it onto the lower concave head, K, where it unites with the water coming through the perforated head, passing thence through the hole in the lower or concave head into the generator or rectifier. Tube H contains a hole directly under faucet G, in or over which is the glass I, through which to observe how fast the spirits are feeding through.

We do not claim on any generator for the manufacture of vinegar or the filling thereof; neither do we claim on any rectifier or the filling thereof; but

What we claim, and desire to secure by Letters Patent, is—

1. The different parts in combination of our condenser, for the purpose of condensing and precipitating and saving the alcohol or spirits or other valuable material contained in the vapors arising and otherwise escaping in the manufacture of vinegar or rectifying of spirits.

2. Feeding the water and spirits separately, by which the water is made to condense the alcoholic vapors, whether these vapors arise from cider, malt, or distilled spirits.

3. Feeding the alcoholic feed through a tube from a tight can, the air having to ascend through the same tube that the feed descends, preventing any escape of vapors in that quarter or connection.

4. The manner in which the tube H is constructed with an observation-glass and connected with the faucet G, cutting off escape of stock in the vapors otherwise lost.

5. The coating of generator and condenser with a composition of rosin, beeswax, olean, and stearine, in such proportion that it will not crack with cold or run with any amount of heat to which it may be necessarily exposed, thus cutting off evaporation or loss through the wood of which the sides of the condenser or generator for vinegar are made.

ASA SCOTT TIFFANY.
ALBERT LUCIEN WILSON.

Witnesses:
W. L. CARROLL,
JAMES T. LANE.